UNITED STATES PATENT OFFICE

ALBIN VITALIS CARLSON, OF DEGERHAMN, SWEDEN

METHOD OF MANUFACTURING POROUS BUILDING MATERIALS

No Drawing. Application filed August 6, 1926, Serial No. 127,702, and in Sweden August 19, 1925.

This invention relates to an improved method of manufacturing porous building materials which have a low heat conducting power and good sound isolating properties and which, furthermore, possess high strength of compression as well as tension. The primary constituents used in this process are cheap and readily available waste products or products occurring in nature and having hitherto no essential value for industrial purpose. Said primary constituents are of such nature that they have per se hydraulic properties, their chemical composition being such that the acid hydraulic factors $Fe_2O_3$, $Al_2O_3$ and $SiO_2$, one or more, always are present therein as essential constituents.

The invention consists, chiefly, in intimately mixing said hydraulic primary constituents in a finely divided state with a basic hydraulic factor, such as unslaked lime, and a substance which evolves gases when reacting with water, adding hydrogen oxide to the mixture for slaking the lime and causing pores in this mass, shaping the mass into pieces and bringing the latter to set and harden.

The addition of hydrogen oxide (water or steam) improves the intimate mixture of the hydraulic acid material with the lime and the heat evolved in slaking the lime generates steam which makes the mass porous. The porosity is further increased by the addition to the mixture of the substances which evolve gases when reacting with the water.

The chief object of the lime added is partly to effect the desired porosity of the mass, partly to prepare the mass for the binding by the heat developed in slaking the lime, and partly to act as catalyst and hydraulic factor in the binding. The lime and its reactions prepare, facilitate and hurry the reactions of the gas evolving substances. The water, which can be used as liquid or as steam, has also the object to give the mass the desired plasticity and to supply heat to the mass, if necessary.

When the mixture of the raw materials and water has been prepared it is shaped into the desired pieces and the latter are hardened in some well-known manner.

The hydraulic materials which can be used according to this invention are the following:

A. Natural hydraulic substances such as santorin earth, puzzuolana, trass, pumice and certain other minerals, as for instance argillaceous schists containing a high percentage of silica or not and having in nature been exposed to high temperatures by which they have obtained hydraulic properties. The composition of such substances is for instance:

|  | Pumice | Argillaceous schist I | Argillaceous schist II |
|---|---|---|---|
|  | Per cent | Per cent | Per cent |
| $SiO^2$ | 61.0 | 70.5 | 89.6 |
| $Al^2O^3$ | 21.0 | 12.9 | 3.0 |
| $Fe^2O^3$ | 4.0 | 6.1 | 2.3 |
| CaO | 1.5 | 1.1 | 1.9 |
| MgO |  | 0.9 | 0.8 |
| Alkalies | 8.0 |  |  |
| Glowing losses | 4.5 | 6.6 | 2.0 |

B. Hydraulic residues and waste products, such as ashes of alum slates and other bituminous slates, ashes of lignites and coals, granulated blast furnace slag, usual blast furnace dust, blast furnace filter dust and other products, which as an essential constituent in varying percentages contain $Fe_2O_3$, $Al_2O_3$ and $SiO_2$ and which in some manner have obtained hydraulic properties, for instance by treatment with an acid, alkali or salt, by roasting or by some combined treatment, such as chlorinating roasting.

C. Hydraulic industrial products having per se hydraulic properties, such as Portland cement, other hydraulic cements and hydraulic lime.

As additions for evolving gases when acted upon by the water used in the mixture the following substances can be used: caustic soda or potash together with small quantities of pulverulent zinc, iron or aluminium, other metal powders and metal carbides.

The fineness of the hydraulic raw materials should be such that at least 5% by weight thereof is present in the form of a fine meal.

The hydration of the mixed raw materials can be effected in various manners, as for instance in silos, in stationary mixers having a rotary agitator or in rotary mixers. The water is supplied at room temperature in which case heat can be supplied from an external source of heat to the mixture, if necessary, or in a hot state or as steam. Overpressure may be used with advantage in effecting the hydration.

When the hydration of the mixture has been finished the mass is slowly cooled whereupon the moulding of the form pieces and their hardening are immediately performed.

The shaping of the hydrated plastic mass into blocks or pieces can be carried out in well-known manner by filling it into moulds or by using a potter's wheel or by expressing it as a string which is cut into bricks or other blocks or by other pressing and cutting operations.

The setting and hardening of the moulded pieces for giving them the desired strength is effected by means of hot air mixed or not with other gases, such as combustion gases, or by means of steam of medium or high pressure or by means of other gases, such as carbon dioxide, at an elevated temperature. A hardening effect can also be reached by burning and sintering the shaped blocks in a similar manner as those used in the manufacture of bricks and clinkers.

What I claim is:

The method of manufacturing a porous building material, which consists in intimately mixing with a foundation mass containing at least one of the compositions $Fe_2O_3$, $Al_2O_3$ and $SiO_2$ an amount of unslaked lime sufficient to give to said foundation mass, when slaked therein, a porosity of small pores throughout the entire mass, adding to said mixture substances to intensify the pore generating process which are capable of giving off gas in reaction with lime and water, and moistening and hydrating the resulting mass so as to cause the pore generating process to take place.

In testimony whereof I have signed my name.

ALBIN VITALIS CARLSON.